United States Patent

[11] 3,589,407

| | | |
|---|---|---|
| [72] | Inventor | Ralph M. Foldenauer<br>Chicago, Ill. |
| [21] | Appl. No. | 787,135 |
| [22] | Filed | Dec. 26, 1968 |
| [45] | Patented | June 29, 1971 |
| [73] | Assignee | Bloomer-Fiske, Inc. |

[54] MEAT MOLD LOADER
9 Claims, 5 Drawing Figs.

[52] U.S. Cl. .................................................. 141/1,
141/258
[51] Int. Cl. ..................................................... B65b 1/04,
B67c 3/26
[50] Field of Search........................................ 141/258,
263, 271, 1; 214/6; 53/258

[56] References Cited
UNITED STATES PATENTS

| | | | | |
|---|---|---|---|---|
| 2,658,630 | 11/1953 | Melin | | 214/6 |
| 2,639,823 | 5/1953 | Madden | | 214/6 |
| 3,070,240 | 12/1962 | Barriol | | 214/6 |
| 2,726,024 | 12/1955 | Hawley | | 141/263 |

*Primary Examiner*—William F. O'Dea
*Assistant Examiner*—Wesley S. Ratliff, Jr.
*Attorney*—Spector & Alster ABSTRACT: A meat mold loader comprises dual-inclined, mold-filling tubes with stuffing horns at the lower ends thereof. A carriage supports a correspondingly inclined dual meat mold unit and is movable upwardly along the incline to telescope the mold of the unit with the horns and filling tubes and bring the lower ends of the molds coincident with the stuffing horns. The carriage is then lowered along the incline while the molds are being filled. The lower end of the carriage has an abutment for the dual mold and a stand adjacent to the abutment. The filled dual mold is swung upwardly from its inclined position to a vertical position approximately about the abutment as a fulcrum. Upon reaching its vertical position the dual mold becomes supported on the stand preparatory to placing end covers on the molds.

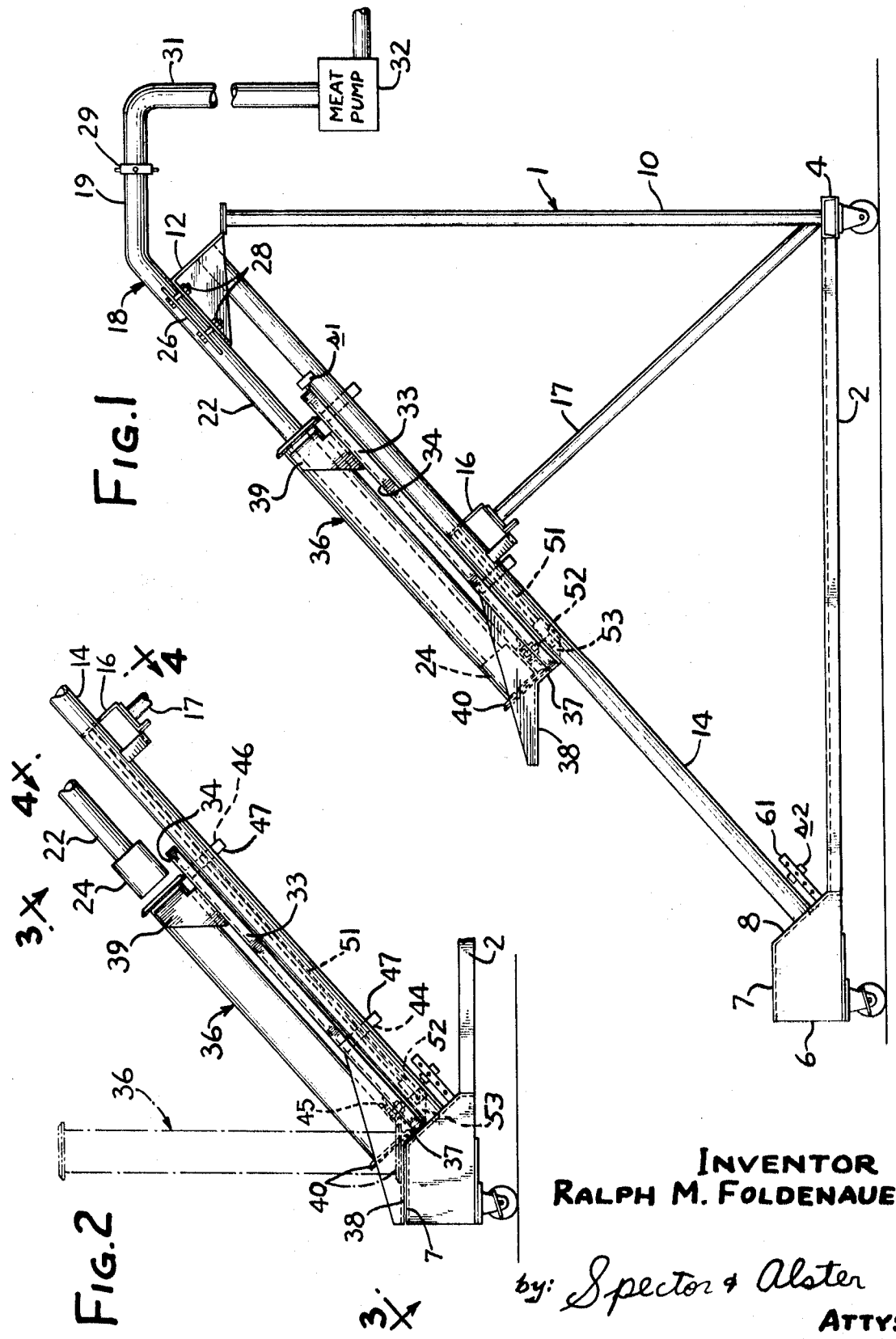

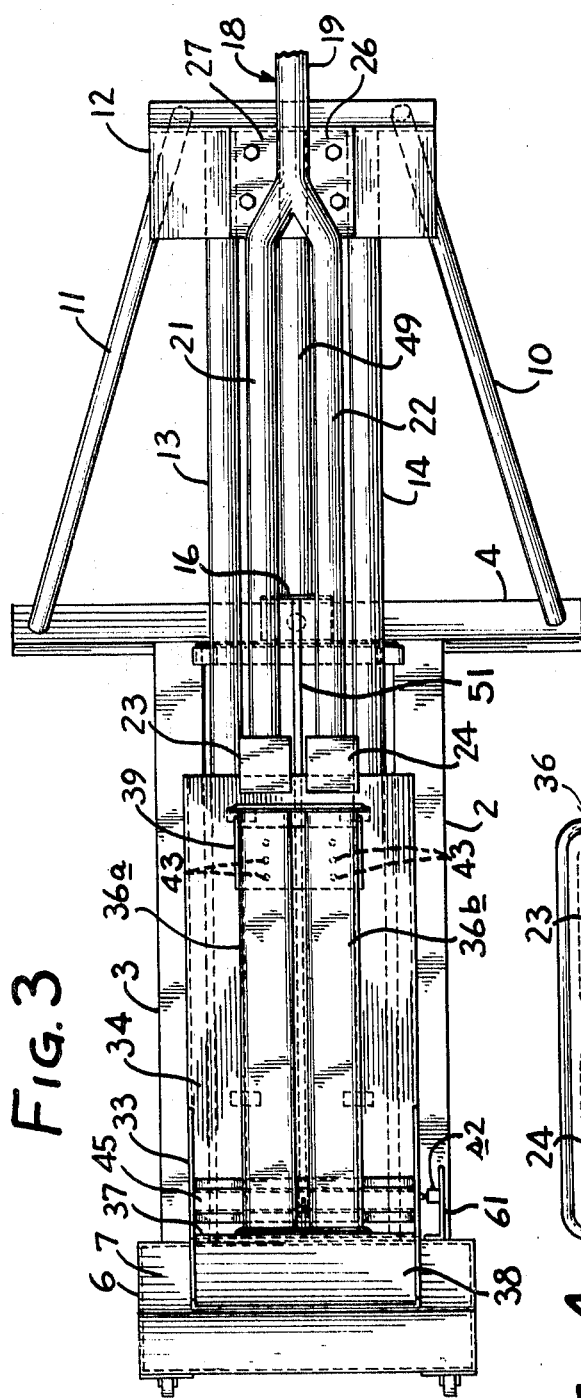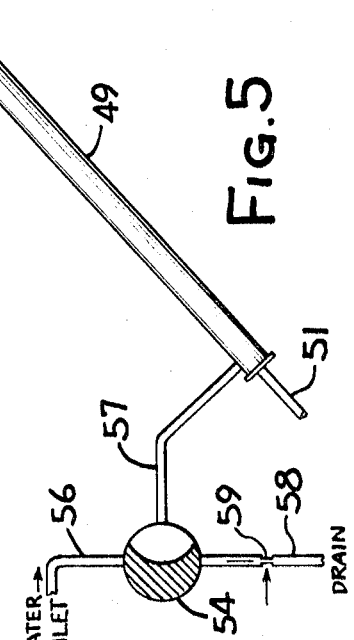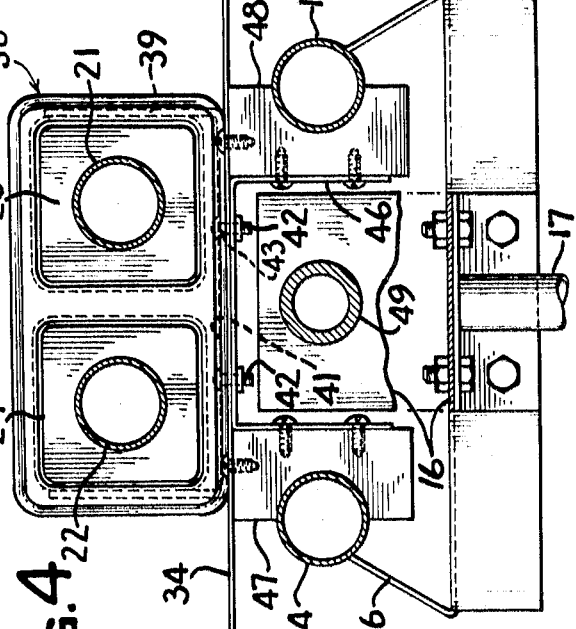

MEAT MOLD LOADER

This invention relates to apparatus for filling meat molds.

It is an object of this invention ro provide a meat mold loader that uniformly fills molds with meat emulsion and is so constructed as to permit the filled mold to be readily handled and positioned for subsequent application of an end cover therefor. The loader is capable of handling dual meat molds of varying lengths.

It is a further object of this invention to provide a meat mold loader of the type stated in which the mold is filled at an incline to the horizontal and wherein the lower end of the mold is supported so that the filled mold may be manually swung from its inclined position to a substantially upstanding position about a fulcrum at the lower supported end of the mold. There is a stand adjacent to such fulcrum and upon which the mold becomes supported as it reaches its upstanding position. This arrangement requires less effort for the workman using the loader to upend the filled mold preparatory to applying an end cover than would be the case if the mold were horizontally loaded and then swung upwardly without benefit of the fulcrum at its lower end.

The attainment of the above and further objects of this invention will be apparent from the following description taken in conjunction with the accompanying drawing forming a part thereof. In the drawing:

FIG. 1 is a side-elevational view of a meat mold loader constructed in accordance with and embodying the present invention and showing the dual mold and mold carriage elevated and preparatory to filling the mold;

FIG. 2 is a fragmentary side-elevational view similar to FIG. 1 but showing the dual mold and carriage lowered and as they would appear after filling the mold;

FIG. 3 is a plan view as seen from line 3–3 of FIG. 2;

FIG. 4 is a fragmentary sectional view taken along line 4–4 of FIG. 2; and

FIG. 5 is a diagram showing the mold carriage elevating cylinder and control therefor.

Referring now in more detail to the drawing, there is shown a wheel-supported meat mold loader comprising a frame 1 having longitudinal bottom channels 2, 3 that are cross-connected at one pair of adjacent ends by a transverse bottom channel 4 and at the other adjacent ends by a structure 6 having a horizontal shelf 7 and an inclined side 8, Joined to and projecting upwardly from the transverse channel 4 are columns 10, 11 the upper ends of which are rigidly connected to a crossmember 12. Rigidly secured at their lower ends to the structure 6 and at their upper ends to the crossmember 12 are spaced parallel guide tubes 13, 14 that extend upwardly at an acute angle to the horizontal bottom channels 2, 3. Intermediate their ends the guide tubes 13, 14 are supported by bracket 16 which is, in turn, rigidly joined to the bottom channel 4 by an inclined brace 17.

Mounted on the crossmember 12 is a meat mold-filling unit 18 that comprises an inlet tube 19 that branches into dual tubes 21, 22 each of which has a tubular stuffing horn 23, 24 at its lower end. The tubes 21, 22 are inclined at the same angle as that of the guide tubes 13, 14 and are thus parallel thereto, and the tubes 21, 22 are of such length that the stuffing horns 23, 24 are approximately midway between the ends of the guide tubes 13, 14. The unit 18 has laterally projecting clips 26, 27 adjacent to the junction of the tubes 21, 22 for receiving bolts 28, 28 by which the unit 18 is secured to the crossmember 12. The upper end of the unit 18 is turned to the horizontal and has a coupling 29 for attachment to a flexible discharge hose 31 from an electrically operated meat-emulsion pump 32.

A carriage 33 has a bottom panel or bed 34 and a lower end for supporting the lower flanged end of a conventional dual meat mold 36. The lower end of the carriage 33 comprises an inclined abutment 37 and an adjacent horizontal stand 38. The abutment 37 may be at right angles to the plane of the bed 34. When the carriage is in its lowered position, the stand 38 is adjacent to the shelf 7 and the abutment 37 is adjacent to the inclined side 8.

The dual mold 36 is a unitary structure having identical molds 36a, 36b which are normally open at their opposite ends but with there being conventional removable closure plates across the lower end of each mold 36a, 36b that are inserted in place within each mold prior to positioning the dual mold 36 onto the carriage 33. The cross section of the interior of the molds 36a, 36b correspond to the cross sections of the stuffing horns 23, 24 so that they provide a close telescoping fit therewith. The dual mold 36 is of such size that the major portion of its lower flanged end 40 projects upwardly of the stand 38 and forms an acute angle therewith.

For aligning the molds 36a, 36b with the stuffing horns 23, 24, the carriage bed 34 has a U-shaped bracket 39 adjacent to its upper end that straddles the top flange of the dual mold 36. The bright 41 of the bracket has secured thereto depending bolts 42 which are capable of being selectively positioned in holes 43 in the carriage bed 34 whereby the bracket 39 may be adjustably positioned along the length of the carriage bed 34. This permits the bracket 39 to be adjustably positioned on the carriage bed 34 to accommodate dual molds of various lengths. Spaced from the abutment 37 the bed 34 has a hat-shaped member 45 that projects from the bed by the normal extent of the mold flange from the mold tubes 36a, 36b so as to support the tubular portions of the molds 36a, 36b and assist in positioning the molds in alignment with the stuffing horns, even though the mold flange 40 may have become bent or damaged due to previous handling of the mold.

Rigidly secured to and depending from the carriage bed 34 are spaced apart brackets 44, 46 each of which supports opposed nylon bearing blocks 47, 48 which are slidable on the guide tubes 13, 14, whereby the carriage 33 is shiftable upwardly and downwardly at the incline of the guide tubes 13, 14. An inclined hydraulic cylinder 49 is positioned between the guide tubes 21, 22 and is mounted at its opposite ends to the crossmember 12 and bracket 16. The cylinder 49 has a piston rod 51 which is connected to a clevis 52 on a plate 53 that is on the underside of the carriage bed 34 at its lower end. As seen in FIG. 5, the cylinder 49 may be water operated and for this purpose a valve 54 is interposed between the water inlet line 56 and the supply line 57 to the cylinder 49. When the valve 54 is manipulated to supply water to the cylinder 49, the piston rod 51 is operated to raise the carriage 33 to the position shown in FIG. 1. When the valve 54 is manipulated to connect the line 56 to the drain line 58, water can flow out of the cylinder and through a restriction 59 to enable the carriage 33 to be lowered to the position shown in FIG. 2.

An empty dual mold 36 is placed onto the carriage 33 while the latter is in its lowermost position. The valve 54 is then operated to raise the carriage 33 and dual mold 36 thereon to telescope the molds 36a, 36b with the respective filling tubes and stuffing horns 23, 24. The carriage 33 is elevated until the stuffing horns are at the lower or closed ends of the molds 36a, 36b. The valve 54 is then shifted to drain the cylinder 49. The meat pump 32 is operated to fill the molds 36a, 36b. Operation of the pump 32 may be effected by a suitable limit switch s1 near the upper ends of the guide tubes 13 and actuated by a part of the carriage 33. The pressure of the meat emulsion entering the molds 36a, 36b applies downwardly inclined force to the mold 36 and carriage 33 tending to lower the carriage 33. This force is resisted as a result of the flow of water from the cylinder 49 through the restriction 59. Consequently, as the molds are lowered and are being filled, the resistance to such lowering acts to eliminate air pockets in the meat emulsion in the mold and produce a filled mold of more uniform density.

When the carriage 33 reaches its lowermost position (FIG. 2), the stuffing horns 23, 24 will clear the open or upper ends of the molds 36a, 36b. The pump 32 is stopped just as the stuffing horns reach the ends of the molds. A limit switch 52 at the lower end of the frame and engaged by a part of the carriage 33 may be used to shut off the meat pump 32. The switches 51, 52 may be wired into the meat pump motor circuit in a known manner. The lower limit switch 52 may be adjustably positioned along the length of a bracket 61 that is secured to the structure 6. This adjustable positioning of the switch 52 enables the loader to be used with molds of various lengths and insure that for the particular length of mold used the meat pump 32 will be cut off at the proper times and thereby provide for a uniform filling of the molds. The dual mold 36 may then be manually grasped and swung upwardly to a vertical position about the junction of the shelf 38 and the abutment 37 as a fulcrum so that the lower flanged end 40 of the dual mold 36 becomes supported on the shelf 38 as shown in broken lines in FIG. 2. Some lateral movement of the dual mold 36 may take place as it is being swung upwardly. While the dual mold 36 is on the shelf 38, conventional spring-loaded covers may be applied to the open upper ends of the molds 36a, 36b. The carriage 33 is now in position for receiving another dual mold 36.

The precise constructions herein shown are illustrative of the principles of the invention. What is considered new and sought to be secured by Letters Patent is:

I claim:

1. A device for filling an elongated meat loaf mold open at one transverse end, comprising a supporting structure, means on the structure for holding such mold at a substantial angle to the horizontal with its open end uppermost, a meat stuffing tube mounted on the structure in axial alignment with the mold and with its discharge end opposite to the open end of the mold in a position to enter the open end of the mold, means for causing relative longitudinal movement between the mold and the tube in a direction axially of the mold for inserting the tube into the mold for filling the mold and retracting the tube as the mold fills.

2. A structure as defined in claim 1 wherein there is provided means forming a horizontal fulcrum extending transversely of the inclined mold across the lower transverse end thereof and on which said transverse end is brought to bear so that the mold may be tilted about its lower transverse end to a vertical position.

3. A structure as defined in claim 2 wherein there is provided means forming a horizontal support adjacent to the fulcrum and at a level substantially that of the fulcrum for receiving and supporting the mold as tilted to a vertical position about said fulcrum.

4. In a meat mold loader, a carriage for removably supporting at an angle to the horizontal a meat mold having an elongated body, said carriage having an abutment for retaining the lower end of the mold against displacement in a downwardly inclined direction, and a stand adjacent to said abutment and underlying said end of the mold and constituting a support for the mold upon movement thereof from its position at an angle to the horizontal to substantially a vertical position.

5. In a meat mold loader, a carriage for removably supporting at an angle to the vertical a meat mold having an elongated body, said carriage having means for retaining the mold against displacement in a downwardly inclined direction, a stand for supporting the mold in a substantially vertical position, and means forming a fulcrum for supporting the lower end of the mold and about which the mold may be swung to a vertical position on the stand substantially as a second-class lever.

6. In a meat mold loader according to claim 4, said abutment being substantially perpendicular to the longitudinal axis of said mold and intersecting with said stand and said intersection is substantially a fulcrum for supporting said end of the mold upon said movement.

7. In a meat mold loader according to claim 6, said mold being open at the other end, mold filling means comprising a stuffing horn, means for moving said carriage relative to said mold filling means in one direction to telescope the two and bring the stuffing horn to said one end of the mold, and said last-named means being operable to provide a resistance to movement of said carriage in the other direction responsive to meat being introduced into said mold through said horn.

8. In a meat mold loader according to claim 7, means for shutting off said mold filling means responsive to the position of said carriage as it moves in said other direction.

9. A method of molding a meat emulsion which comprises—positioning an elongated meat mold that has an open transverse end with its longitudinal axis at a substantial angle to the horizontal and its open end uppermost, telescoping a stuffing tube into the open end of the mold to substantially the opposite end of the mold and then forcing a meat emulsion under pressure through the stuffing tube into the mold, progressively untelescoping the mold and the tube as the mold fills, and when the mold has the required amount of meat emulsion therein separating the tube from the mold and supporting the bottom transverse side of the mold on a transverse horizontal fulcrum and swinging the mold to a vertical position with its open end uppermost for the application of a spring-loaded cover to the open end of the mold.